No. 680,955. Patented Aug. 20, 1901.
J. D. WINTZ.
CAR FENDER.
(Application filed May 7, 1901.)

(No Model.) 2 Sheets—Sheet 1.

Witnesses  J. D. Wintz, Inventor.
C. H. Walker  by Eugene W. Johnson,
J. C. Johnson  Attorney.

THE NORRIS PETERS CO., PHOTO-LITHO., WASHINGTON, D. C.

No. 680,955. Patented Aug. 20, 1901.
J. D. WINTZ.
CAR FENDER.
(Application filed May 7, 1901.)
(No Model.) 2 Sheets—Sheet 2.
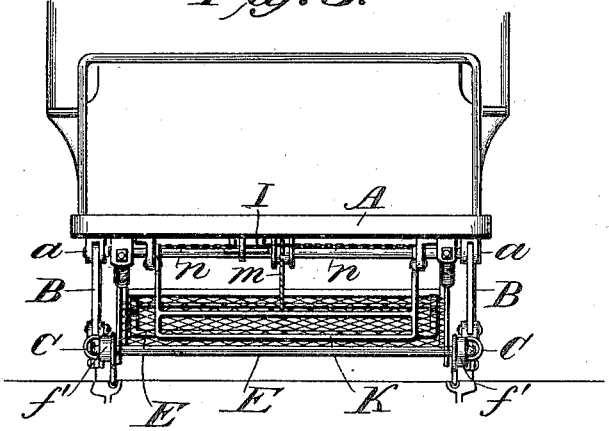
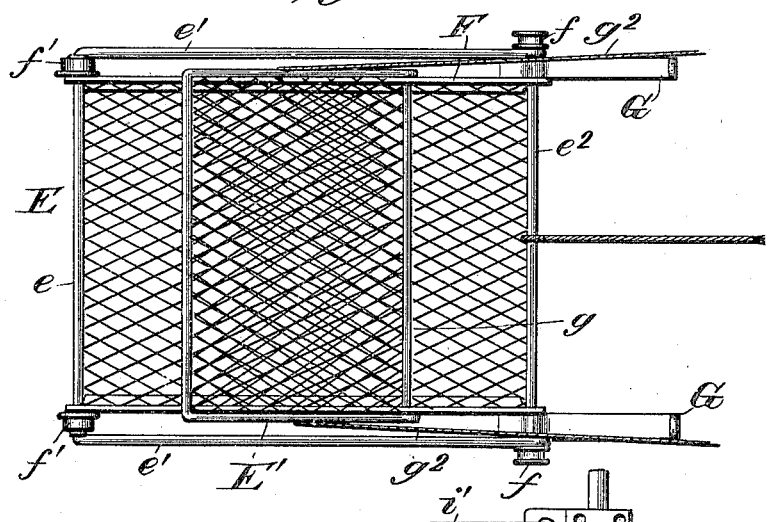
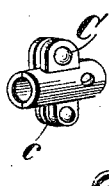
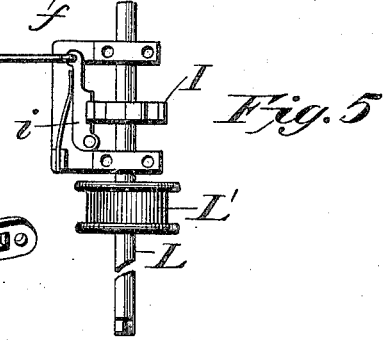
Witnesses
C. H. Walker
J. C. Johnson
by
J. D. Wintz, Inventor.
Eugene W. Johnson
Attorney

UNITED STATES PATENT OFFICE.

JEFFERSON D. WINTZ, OF NEW ORLEANS, LOUISIANA, ASSIGNOR OF ONE-HALF TO DAVID G. BALDWIN, OF SAME PLACE.

CAR-FENDER.

SPECIFICATION forming part of Letters Patent No. 680,955, dated August 20, 1901.

Application filed May 7, 1901. Serial No. 59,136. (No model.)

*To all whom it may concern:*

Be it known that I, JEFFERSON D. WINTZ, a citizen of the United States, residing at New Orleans, in the parish of Orleans and State of Louisiana, have invented new and useful Improvements in Car-Fenders of the Trip and Shoot-Forward Type, of which the following is a specification.

This invention relates to certain new and useful improvements in car-fenders of the trip and shoot-forward type, one object being to provide a fender of improved construction which is so connected to the car that in case the car should leave the track the fender may move toward the platform, so as not to be injured by contact with the ground, the upward movement of the fender also saving it from injury by engagement with minor obstructions on the track.

A further object of my invention is to provide a fender which may be projected by actuating a trip, the trip having its actuating means both above and below the platform.

The invention consists in the construction and combination of the parts, as will be hereinafter set forth, the make-up including a main fender and a second one which is pivotally connected thereto, so as to be projected upwardly when the main fender is shot forward, the supplemental fender folding upon the main fender when it is retracted, the invention also including means for projecting and retracting the fenders and the specific construction of the means employed for attaching the fenders to the car.

Figure 1:
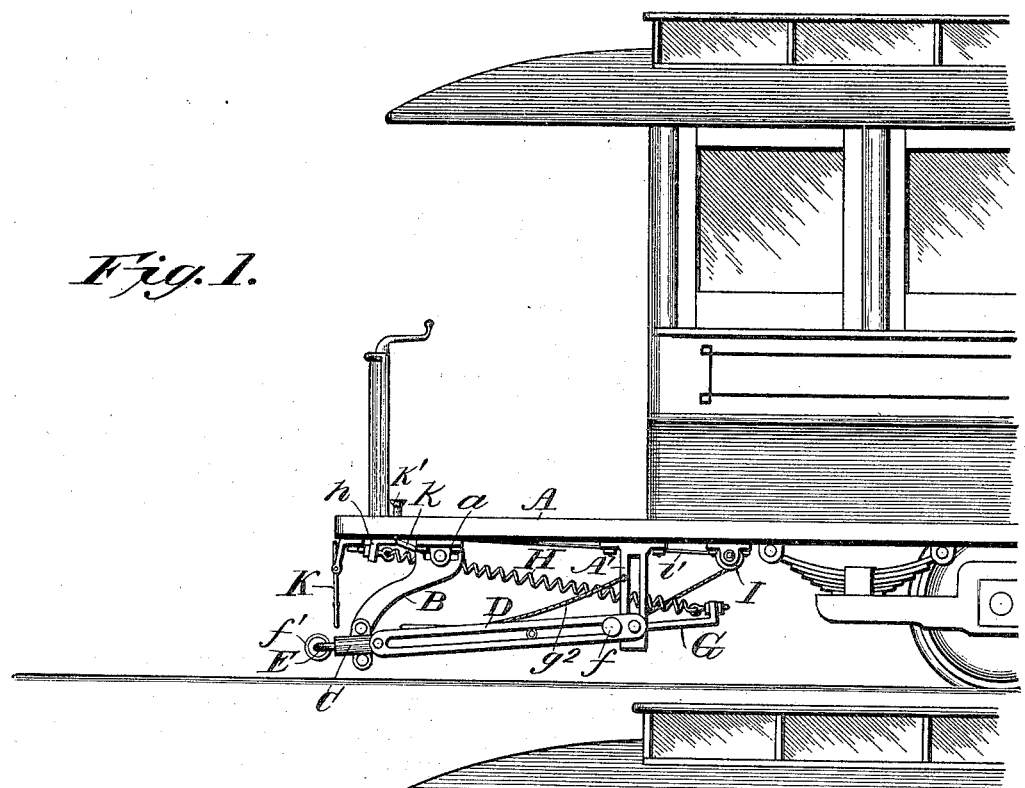
Figure 2:
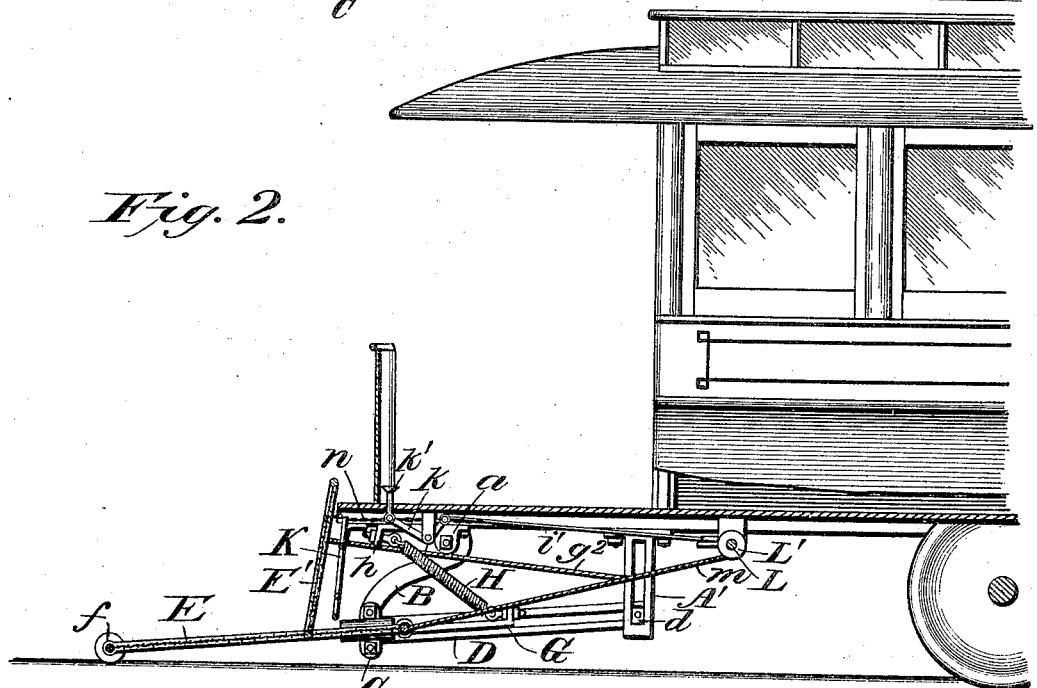

In the accompanying drawings, Figure 1 is a side elevation showing my improved fender applied to a car, the same being illustrated as in a retracted position and beneath the car-platform. Fig. 2 is a sectional view, the fender being shown projected or in a position for use. Fig. 3 is a front elevation; Fig. 4, a plan view of the fender detached, and Figs. 5 and 6 detail views.

In the accompanying drawings, A refers to the platform of a car, and at a suitable distance from the front end, on the under side, are attached hangers $a$ and A', the front hanger having depending lugs between which are pivoted downward and forwardly projecting arms B, the upper ends thereof having slots through which pass pins which engage with the hangers $a\ a$. By thus connecting the arms of the hangers the arms are not only susceptible of a pivotal movement, but also may move backward and forward, as occasion may require, to permit the upward movement of the arms and parts carried thereby. The rear hangers A' are provided with vertical slots, and said hangers are rigidly attached to the under side of the car-platform, so as to depend therefrom.

The lower ends of the arms B B have attached thereto castings C, having upwardly-projecting lugs, to which are connected the lower ends of the arms B, and also depending lugs, between which are journaled rollers $c$, said rollers projecting into the guide-opening through which pass the side bars of the fender. To the guide C and rear hanger are attached slotted connecting-bars D, which have at their rear ends slides $d$ for engagement with the vertical slots of the hangers, and the slides rest normally upon the lower ends of the slots. The forward ends of the bars are connected to the outer sides of the guides C.

The fender E is made up of an outer bar, which is bent to present a front cross-bar $e$ and side bars $e'$, the ends being formed into eyes, through which passes a rear cross-bar $e^2$, which carries at its ends flanged rollers $f$, said rollers engaging the side bars D of the supporting-frame. The front end of the fender-frame carries rollers $f'$, which engage with the track when the fender is projected. The front bar $e$ of the fender and its rear cross-bar $e^2$ are connected by bars of angle-iron F, and to these bars and to the front and rear bars of the fender is attached the netting. The angle-bars not only strengthen the main frame of the fender, but also provide means for connecting thereto a supplemental frame E', which is projected upwardly in front of the car when the main fender is projected. The supplemental frame E' has a cross-bar $g$, which is journaled in the upwardly-projecting flange of the angle-bars above where the netting is attached, and the side pieces of this fender E are connected to some fixed portion of the car or to the fender-support by cords or flexible connections $g^2$ in such a manner that when the main fender is projected the supplemental fender will be raised to extend upwardly in front of the car, as shown in Fig. 2, and when the main fender is retracted the supplemental fender will fold down upon the main fender. It will be noted that the supplemental fender is not lifted until the main fender is projected considerably in front of the car.

Attached to the rear cross-bar $e^2$ of the fender, beyond the angle-bars F, are rearwardly-projecting bars or plates G, the rear upturned ends having perforations for the reception of eyebolts, to which are secured the ends of springs H, the front ends of said springs being attached to eyebolts which engage with angle-plates $h$, attached to the forward portion of the car, beneath the platform, these springs being for the purpose of projecting the fender.

I refers to a fixture which is attached to the under side of the car, rear of the fender-supporting frame, said fixture having shaft-bearings through which passes a shaft having a ratchet-wheel with which engages a spring-actuated pawl carried by the frame I, and the shaft L also carries a drum L', about which passes a flexible connection $m$, which extends from said drum to the rear cross-bar of the fender. To the under side of the platform, supported by a suitable bracket, is a bell-crank lever $k$, the rear end being connected by a rod or flexible connection $i'$ to the pawl $i$, which is pivoted upon the frame I, and the forward member of the bell-crank lever carries a trip $k'$, which projects through the platform, so that by depressing the trip the pawl will be disengaged from the ratchet-wheel on the shaft. To the front of the platform is secured a depending frame K, which has side bars which extend above its pivotal points, and from the upper ends of this depending frame there extends a connection $n$, which is secured to the rear and upwardly projecting member of the bell-crank lever, so that when the lower portion of the depending frame is swung rearwardly it will also actuate the pawl and release the shaft, so that the springs may act to project the fender. Thus I provide means for manually and automatically releasing the fender, so that it will be projected by the springs. The shaft L has one of its ends squared, so that it may be engaged by an ordinary crank-handle for turning the shaft to retract the fender. The arms B being pivoted at their upper ends so as to be susceptible of a backward and forward movement on the pivot-pins and the bars D being pivoted at their rear ends to the fixed hangers admit of an upward movement of the fender-carrying frame in case the car leaves the track or an obstruction on the track should get under the fender.

I claim—

1. In a car-fender, the combination of fixed rear hangers having vertical slots, pivotally-supported front hangers, guides attached to the lower ends of the front hangers, slotted bars engaging the guides and the rear hangers, a fender having side bars embraced by the guides and rollers which engage the slotted bars, springs for projecting the fender connected thereto and to the car-platform, means for retracting the fender and holding it retracted against the action of the spring, trips located above and below the platform for releasing the retracting and holding means, substantially as shown and for the purpose set forth.

2. In a car-fender, the combination with rear hangers having vertical slots, pivotally-supported front hangers, slotted bars attached to the hangers to have a vertical movement at their rear ends, the front ends of the bars being susceptible of an upward movement with the hangers, of a fender which engages the slotted bars and guides carried by the front hangers, a trip-frame which depends from the car-platform, and means for projecting the fender when the trip is actuated, substantially as shown and for the purpose set forth.

3. In a car-fender, the combination of fixed rear hangers, pivoted front hangers, slotted guide-bars carried by the hangers, a main fender having outer side bars which movably engage a fixture carried by the front hangers, rollers which engage the slotted bars, track-rollers at the front of the fender, bars which extend rear of the fender-frame, springs attached to said bars and to the under side of the car-body, a shaft having a drum and a ratchet-wheel, a flexible connection between the drum and fender, a pawl adapted to engage the ratchet-wheel and trips for throwing the pawl out of engagement with the ratchet-wheel, substantially as shown.

4. The combination with a fender which is located beneath the platform of the car and maintained thereunder to be susceptible of being raised by pressure on the under side thereof, springs attached to rearward-projecting arms carried by the fender and to the under side of the platform near its forward end, means for holding the fender against the action of the springs, trips for releasing the holding means, of a supplemental fender pivoted to the frame of the main fender, flexible connections attached to the supplemental fender and to a fixture so that the supplemental fender will be swung on its pivot when the main fender is projected, substantially as set forth.

In testimony whereof I have hereunto set my hand in presence of two subscribing witnesses.

JEFFERSON D. WINTZ.

Witnesses:
 JNO. F. WHITAKER,
 RUFUS E. FOSTER.